(12) United States Patent
Lu et al.

(10) Patent No.: US 11,233,462 B2
(45) Date of Patent: Jan. 25, 2022

(54) POWER CONVERTER AND POWER SUPPLY SYSTEM

(71) Applicant: Delta Electronics (Shanghai) Co., Ltd., Shanghai (CN)

(72) Inventors: Cheng Lu, Shanghai (CN); Yong Tao, Shanghai (CN); Wenfei Hu, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/035,749

(22) Filed: Sep. 29, 2020

(65) Prior Publication Data

US 2021/0143749 A1 May 13, 2021

(30) Foreign Application Priority Data

Nov. 8, 2019 (CN) .......................... 201911086426.2

(51) Int. Cl.
*H02M 7/219* (2006.01)
*H02M 1/10* (2006.01)
*H02M 7/217* (2006.01)

(52) U.S. Cl.
CPC ............. *H02M 7/219* (2013.01); *H02M 1/10* (2013.01); *H02M 7/2176* (2013.01)

(58) Field of Classification Search
CPC ....... H02M 7/219; H02M 1/10; H02M 7/2176
See application file for complete search history.

(56) References Cited

U.S. PATENT DOCUMENTS

2012/0163044 A1* 6/2012 Mayor Miguel ....... H02P 27/14
363/37
2015/0236591 A1* 8/2015 Hasegawa ............... H02M 5/02
323/271

(Continued)

FOREIGN PATENT DOCUMENTS

CN 201435701 Y 3/2010
CN 101873067 A 10/2010

(Continued)

OTHER PUBLICATIONS

Corresponding China Office Action dated Oct. 27, 2021.

*Primary Examiner* — Kyle J Moody
*Assistant Examiner* — Lakaisha Jackson
(74) *Attorney, Agent, or Firm* — CKC & Partners Co., LLC

(57) ABSTRACT

The present application provides a power converter and a power supply system, the power converter includes: a star/delta switching unit, a first power conversion unit, a second power conversion unit, a third power conversion unit, and a controller; AC terminals of the first power conversion unit, the second power conversion unit and the third power conversion unit are connected to a three-phase AC terminal through the star/delta switching unit, and DC terminals of the first power conversion unit, the second power conversion unit, and the third power conversion unit are connected to a DC power terminal; wherein the controller is configured to control the star/delta switching unit according to a signal reflecting a voltage of the DC power terminal, to form a star connection or a delta connection among the three-phase AC terminal and the first power conversion unit, the second power conversion unit and the third power conversion unit.

22 Claims, 11 Drawing Sheets

(56) References Cited

U.S. PATENT DOCUMENTS

| | | | |
|---|---|---|---|
| 2019/0052177 A1 | 2/2019 | Lu et al. | |
| 2020/0235656 A1* | 7/2020 | Forouzesh | H02M 1/4216 |
| 2021/0119550 A1* | 4/2021 | Tsuruta | H02M 7/2173 |
| 2021/0135486 A1* | 5/2021 | Liu | H02M 1/325 |

FOREIGN PATENT DOCUMENTS

| | | |
|---|---|---|
| CN | 102931854 A | 2/2013 |
| CN | 103151947 A | 6/2013 |
| CN | 105429472 A | 3/2016 |
| CN | 207732448 U | 8/2018 |
| CN | 109818503 A | 5/2019 |

\* cited by examiner

POWER CONVERTER AND POWER SUPPLY SYSTEM

CROSS-REFERENCE TO RELATED APPLICATION

This application claims priority to Chinese Patent Application No. 201911086426.2, filed on Nov. 8, 2019, the content of which is hereby incorporated by reference in its entirety.

TECHNICAL FIELD

The present application relates to electronic technologies, and in particular, to a power converter and a power supply system.

BACKGROUND

With the development of distributed power generation technologies with new energy and the increasing number of Direct Current (DC) devices, the demand for low-voltage DC distribution is increasing. In a traditional low-voltage DC power distribution system, a power frequency isolation transformer is used for implementing the power distribution, which has defects such as high transmission costs, large losses, high light load losses and large volumetric weights and the like, thereby becoming one of bottlenecks for achieving a high power density and a high efficiency smart grid.

Gradually, a conventional power frequency isolation transformer is replaced by a high frequency isolation power electronic transformer (PET). The existing PET usually employs a two-stage converter, wherein cascaded AC/DC converters form a first stage to convert a medium AC voltage into multiple intermediate DC voltages, and output-paralleled DC/DC converters form a second stage to convert the intermediate DC voltages into a low DC voltage. However, due to a narrow range of the intermediate DC voltage and a limited gain capability of the second stage converters, an output range of the DC voltage of the existing PET is relatively limited.

For high-power loads or equipment with wider voltage ranges, such as electric vehicles, energy storage devices, and photovoltaic devices, in the existing low-voltage DC power distribution system, a low-voltage DC bus is built by virtue of the PET and an additional DC/DC converter between the PET and the load is added to meet voltage requirements of different DC loads or equipment.

However, since an additional DC/DC converter needs to be added in the existing low-voltage DC power supply system architecture, thereby leading to a low work efficiency, a high system complexity, and an increased cost.

SUMMARY

The present application provides a power converter and a power supply system, thereby broadening a voltage range of a DC power terminal and realizing a wide voltage range.

According to a first aspect of the present application, a power converter is provided, including: a star/delta switching unit, a first power conversion unit, a second power conversion unit, a third power conversion unit, and a controller;

AC terminals of the first power conversion unit, the second power conversion unit, and the third power conversion unit are connected to a three-phase AC terminal through the star/delta switching unit, DC terminals of the first power conversion unit, the second power conversion unit, and the third power conversion unit are connected to a DC power terminal;

wherein the controller is configured to control the star/delta switching unit according to a signal reflecting a voltage of the DC power terminal, and the star/delta switching unit is configured to form a star connection or a delta connection among the three-phase AC terminal and the first power conversion unit, the second power conversion unit and the third power conversion unit.

According to a second aspect of the present application, a power supply system is provided, including the power converter according to any one of the first aspect and embodiments thereof of the present application, where the three-phase AC terminal of the power converter is connected to a grid directly or connected to a grid through a filter, and the DC power terminal is connected to a load or a power equipment.

BRIEF DESCRIPTION OF DRAWINGS

In order to more clearly illustrate the technical solutions in the embodiments of the present application or in the prior art, the drawings needed to be used in the description of the embodiments or the prior art will be briefly described below. Obviously, the drawings in the following description are some embodiments of the present application, for those skilled in the art, other drawings can be obtained according to these drawings without paying any creative efforts.

DESCRIPTION OF EMBODIMENTS

Figure 1:
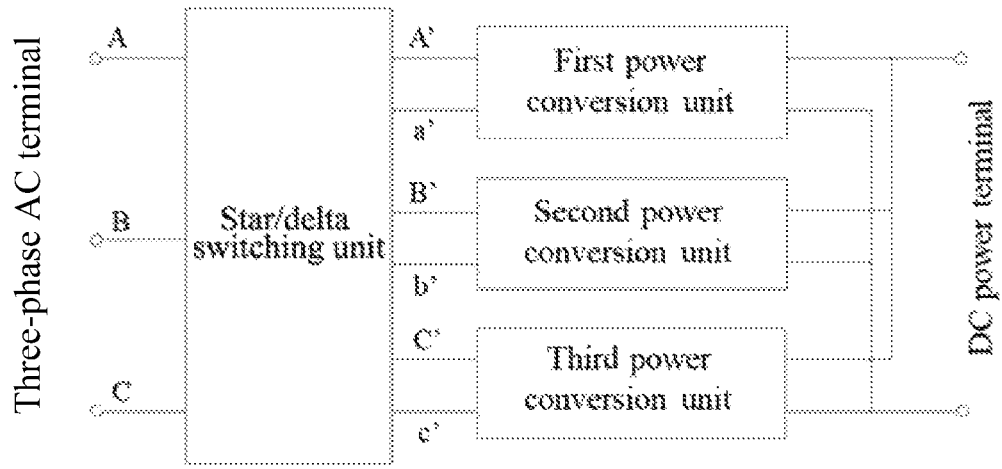
FIG. 1 is a schematic structural diagram of a power converter according to an embodiment of the present application.

In order to make the objects, technical solutions and advantages of the embodiments of the present application more clear, the technical solutions in the embodiments of the present application will be clearly and completely described in combination with the drawings in the embodiments of the present application. Obviously, the described embodiments are part of the embodiments of the present application, but not all of the embodiments. Based on the embodiments of the present application, all other embodiments obtained by those skilled in the art without creative efforts are within the protection scope of the present application.

Moreover, the terms "first" and "second" are used for descriptive purposes only and are not to be construed as indicating or implying a relative importance or implicitly indicating the number of technical features indicated. Thus, features defined with "first" and "second" may include one or more of the features either explicitly or implicitly. In the description of the present application, the meaning of "multiple" is at least two, such as two, three, or the like, unless specifically defined otherwise.

It should be understood that in the present application, "include" and "have" and any variations thereof are intended to cover non-exclusive inclusions, for example, systems, products, or devices that include a series of units are not necessarily limited to those units that are clearly listed, but may include other units not explicitly listed or inherent to these products or devices.

It should be understood that in the present application, "multiple" means two or more. "Including A, B or C" means one of A, B and C.

It should be understood that in the present application, "B corresponding to A", "B that corresponds to A", "A corresponds to B" or "B corresponds to A" denote that the shapes or functions of B and A have a corresponding relationship, B can be determined according to A. Determining B according to A does not mean that B is only determined according to A, and B can also be determined according to A and/or other information.

It should be understood that in the present application, an "AC/DC subunit" refers to a subunit for converting an AC signal into a DC signal or converting a DC signal into an AC signal. An "isolated DC/DC subunit" refers to a subunit that is isolated for converting a DC signal to another DC signal.

It should be understood that in the present application, a voltage of a certain component and a voltage signal of a certain component can be understood as a voltage value of a certain component when used for comparison. Similarly, a current of a component or a current signal of a component can also be understood as a current value of a certain component when used for comparison.

The technical solutions of the present application are described in detail below with specific embodiments. The examples of the embodiments are illustrated in the drawings, where the same or similar components or components having the same or similar functions are denoted by the same or similar reference numerals throughout. The following specific embodiments may be combined with each other, and the same or similar concepts or processes may not be described for detail in some embodiments.

FIG. 1 is a schematic structural diagram of a power converter according to an embodiment of the present application. The power converter as shown in FIG. 1 includes a star/delta switching unit, a first power conversion unit, a second power conversion unit, a third power conversion unit, and a controller (not shown). AC terminals of the first power conversion unit, the second power conversion unit, and the third power conversion unit are connected to a three-phase AC terminal through the star/delta switching unit, DC terminals of the first power conversion unit, the second power conversion unit, and the third power conversion unit are connected to a DC power terminal.

The controller is configured to control the star/delta switching unit according to a signal reflecting a voltage of the DC power terminal, where the star/delta switching unit is configured to form a star connection or a delta connection among the three-phase AC terminal and the first power conversion unit, the second power conversion unit and the third power conversion unit.

In the embodiment, the controller switches the star-delta switching unit to form the star connection or the delta connection according to the signal reflecting the voltage of the DC power terminal, thereby to achieve a wide voltage range of the DC power terminal. So the power converter may directly connect to a DC load or a power equipment with wide voltage range without adding redundant converters, having advantages of a high power density, a low cost and a high efficiency, and realizing AC-DC voltage conversions for medium and high voltages.

Figure 2:
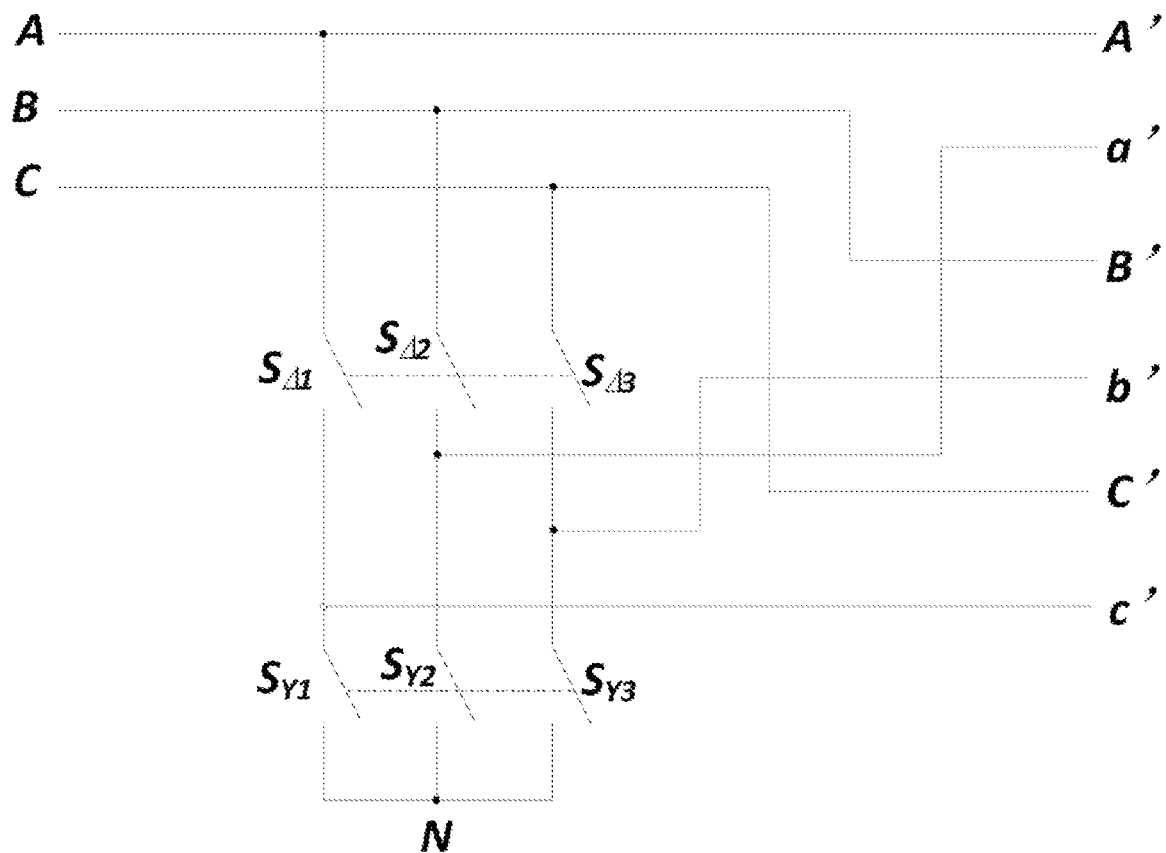
FIG. 2 is a schematic structural diagram of a star/delta switching unit according to an embodiment of the present application.

In the embodiment shown in FIG. 1, the star/delta switching unit may have various kinds of structures, for example, the star/delta switching unit may include multiple switches. Referring to FIG. 2, which is a schematic structural diagram of a star/delta switching unit according to an embodiment of the present application. The star/delta switching unit shown in FIG. 2 includes: a first delta switch $S_{A1}$, a second delta switch $S_{A2}$, a third delta switch $S_{A3}$, a first star switch $S_{Y1}$, a second star switch $S_{Y2}$ and a third star switch $S_{Y3}$. A first phase line A of the three-phase AC terminal is connected to a first AC terminal A' of the first power conversion unit, and is connected to a second AC terminal c' of the third power conversion unit through the first delta switch $S_{A1}$. A second phase line B of the three-phase AC terminal is connected to a first AC terminal B' of the second power conversion unit, and is connected to a second AC terminal a' of the first power conversion unit through the second delta switch $S_{A2}$. A third phase line C of the three-phase AC terminal is connected to a first AC terminal C' of the third power conversion unit, and is connected to a second AC terminal b' of the second power conversion unit through the third delta switch $S_{A3}$. Further, the second AC terminal a' of the first power conversion unit is connected to a neutral node N through the second star switch $S_{Y2}$, the second AC terminal b' of the second power conversion unit is connected to the neutral node N through the third star switch $S_{Y3}$, and the second AC terminal c' of the third power conversion unit is connected to the neutral node N through the first star switch $S_{Y1}$. It should be noted that the structure of the star/delta switching unit is not limited thereto, and there may be other connection manners.

Taking the star/delta switching unit shown in FIG. 2 as an example, when the controller controls the first delta switch $S_{A1}$, the second delta switch $S_{A2}$, and the third delta switch $S_{A3}$ of the star/delta switching unit to be on, and controls the first star switch $S_{Y1}$, the second star switch $S_{Y2}$, and the third star switch $S_{Y3}$ to be off, the connection of the star/delta switching unit is delta connection. Conversely, when the controller controls the first star switch $S_{Y1}$, the second star switch $S_{Y2}$, and the third star switch $S_{Y3}$ of the star/delta switching unit to be on, and controls the first delta switch $S_{A1}$, the second delta switch $S_{A2}$ and the third delta switch $S_{A3}$ to be off, the connection of the star/delta switching unit is star connection.

When the star connection is employed, input voltages of the first power conversion unit, the second power conversion unit, and the third power conversion unit respectively correspond to three-phase AC phase voltages. When the delta connection is employed, input voltages of the first power conversion unit, the second power conversion unit, and the third power conversion unit respectively correspond to three-phase AC line voltages. The switching of the star connection and the delta connection broadens the working range of the three-phase AC voltage.

In the above embodiment, the signal reflecting the voltage of the DC power terminal may be, for example, a sampled voltage of the DC power terminal or a preset voltage of the DC power terminal. The preset voltage of the DC power terminal is, for example, a voltage set for the DC power terminal according to a user's operation setting. In order to explain how the controller performs control according to the signal reflecting the voltage of the DC power terminal, in the following various embodiments, examples are taken where the sampled voltage of the DC power terminal is used as the signal reflecting the voltage of the DC power terminal. For the preset voltage of the DC power terminal, the control may be performed following the same principle, which will not be described in detail again below.

The control of the star/delta switching unit will be described below in combination with FIG. 3 to FIG. 6c and specific embodiments, numerical values in circles indicate value ranges corresponding to each area condition.

Figure 3:
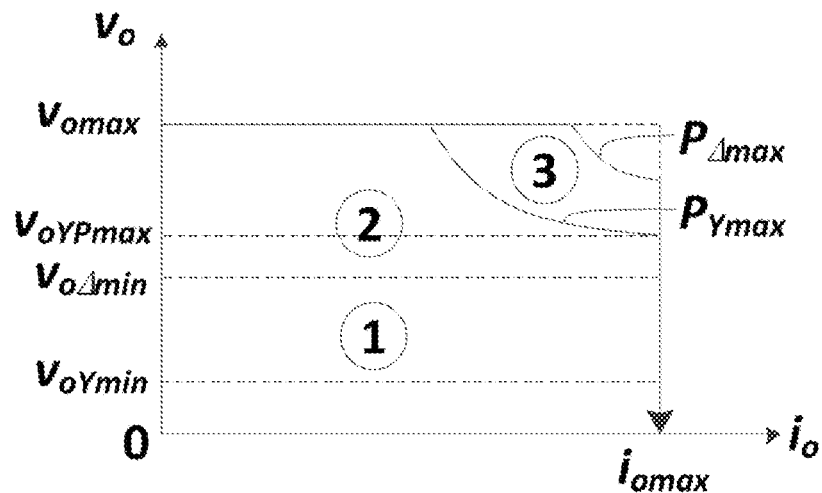
FIG. 3 is a schematic diagram of area conditions of a power converter according to an embodiment of the present application.

Referring to FIG. 3, which is a schematic diagram of area conditions of the power converter according to an embodiment of the present application.

Figure 4A:
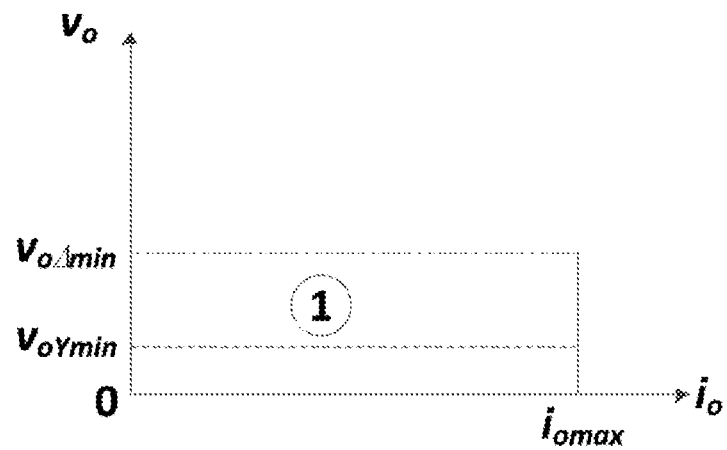
FIG. 4a is a schematic diagram of a first area condition according to an embodiment of the present application.

As shown in FIG. 3, a first area condition is that the voltage of the DC power terminal is greater than or equal to a first voltage threshold, and less than a second voltage threshold, that is: the first voltage threshold $(v_{oYmin})$≤the voltage of the DC power terminal<the second voltage threshold $(v_{o\Delta min})$. Referring to FIG. 4a, which is a schematic diagram of a first area condition according to an embodiment of the present application. The controller is specifically configured to control the star/delta switching unit to form a star connection when the voltage of the DC power terminal satisfies the first area condition.

Figure 4B:
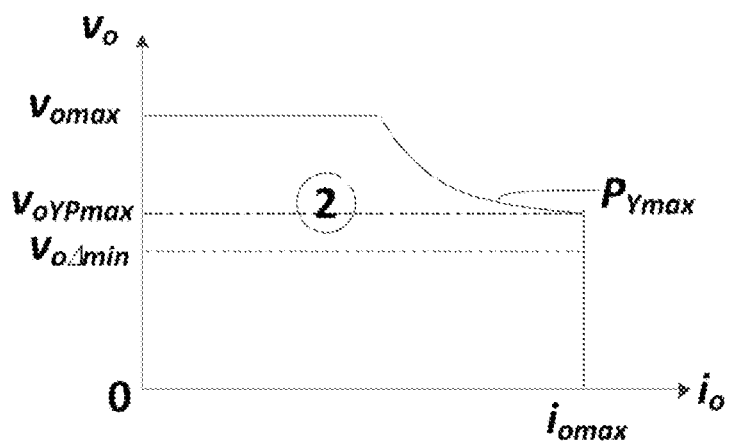
FIG. 4b is a schematic diagram of a second area condition according to an embodiment of the present application.

A second area condition is that the voltage of the DC power terminal is greater than or equal to the second voltage threshold, and less than or equal to a maximum voltage threshold, and a power of the DC power terminal is less than or equal to a first power threshold, that is: the second voltage threshold $(v_{o\Delta min})$≤the voltage of the DC power terminal≤the maximum voltage threshold $(v_{omax})$, and a power of the DC power terminal≤the first power threshold $(P_{Ymax})$. Referring to FIG. 4b, which is a schematic diagram of a second area condition according to an embodiment of the present application. The controller is configured to control the star/delta switching unit to form a delta connection or a star connection when the voltage and the power of the DC power terminal satisfies the second area condition.

Figure 4C:
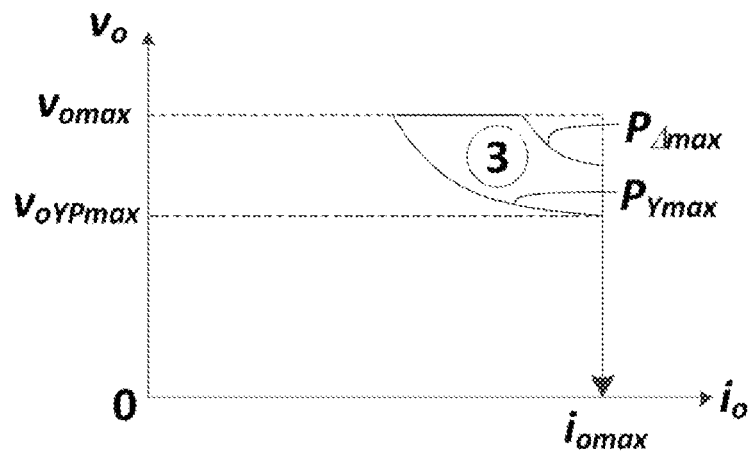
FIG. 4c is a schematic diagram of a third area condition according to an embodiment of the present application.

A third area condition is that the voltage of the DC power terminal is greater than or equal to a third voltage threshold, and less than or equal to the maximum voltage threshold, and the power of the DC power terminal is greater than the first power threshold, and less than or equal to a second power threshold, that is: the third voltage threshold $(v_{oYPmax})$≤the voltage of the DC power terminal≤the maximum voltage threshold $(v_{omax})$, and the first power threshold $(P_{Ymax})$<the power of the DC power terminal≤the second power threshold $(P_{\Delta max})$. Referring to FIG. 4c, which is a schematic diagram of a third area condition according to an embodiment of the present application. The controller is configured to control the star/delta switching unit to form a delta connection when the voltage and the power of the DC power terminal satisfies the third area condition.

In some embodiments, the first voltage threshold $(v_{oYmin})$ is a minimum DC output voltage of the DC power terminal measured in advance under the star connection; the second voltage threshold $(v_{o\Delta min})$ is a minimum DC output voltage of the DC power terminal measured in advance under the delta connection; the maximum voltage threshold $(v_{omax})$ is a maximum DC output voltage of the DC power terminal measured in advance; the third voltage threshold $(v_{oYPmax})$ is a DC output voltage measured in advance under the star connection corresponding to the maximum output power and maximum output current of the DC power terminal; the first power threshold $(P_{Ymax})$ is a maximum output power of the DC power terminal measured in advance under the star connection; and the second power threshold $(P_{\Delta max})$ is a maximum output power of the DC power terminal measured in advance under the delta connection. It should be noted that each of the foregoing thresholds may be directly set in advance according to converter parameters or according to an individual's needs.

The second power threshold $(P_{\Delta max})$ is the maximum output power under the delta connection, which is a maximum output power of the system. Wherein, the converter will not reach voltage and current stresses simultaneously, and the voltage and current stresses usually have a margin greater than a thermal stress, the second power threshold≤the maximum voltage threshold*the maximum output current, that is $P_{\Delta max} \leq v_{omax} * i_{omax}$. Moreover, in an embodiment with the presentation of an intermediate DC bus and an isolated DC/DC subunit below, when a DC-Link voltage and the isolated DC/DC unit have wide adjusting ranges, the second voltage threshold $(v_{o\Delta min})$≤the third voltage threshold $(v_{oYPmax})$. In some embodiments, the first power conversion unit, the second power conversion unit, and the third power conversion unit may include boost type AC/DC subunits.

Figure 5:
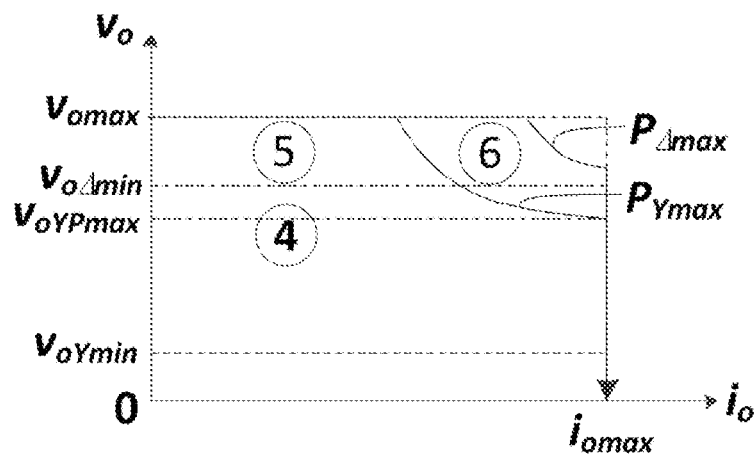
FIG. 5 is a schematic diagram of area conditions of a power converter according to an embodiment of the present application.
Figure 6A:
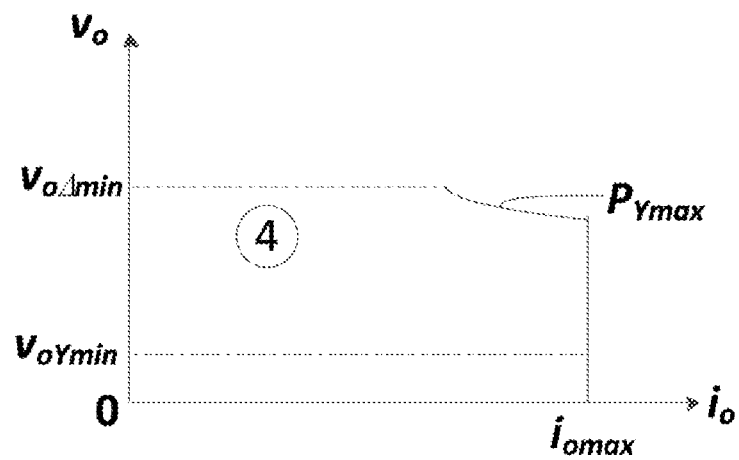
FIG. 6a is a schematic diagram of a fourth area condition according to an embodiment of the present application.

Referring to FIG. 5, which is schematic diagram of area conditions of another power converter according to an embodiment of the present application. As shown in FIG. 5:

A fourth area condition is that the voltage of the DC power terminal is greater than or equal to a first voltage threshold, and less than a second voltage threshold, and a power of the DC power terminal is less than or equal to a first power threshold, that is: the first voltage threshold ($v_{oYmin}$)≤the voltage of the DC power terminal<the second voltage threshold ($v_{o\Delta min}$), and a power of the DC power terminal≤the first power threshold ($P_{Ymax}$). Referring to FIG. 6a for details, which is a schematic diagram of a fourth area condition according to an embodiment of the present application. The controller is specifically configured to control the star/delta switching unit to form a star connection when the voltage and power of the DC power terminal satisfies the fourth area condition.

Figure 6B:
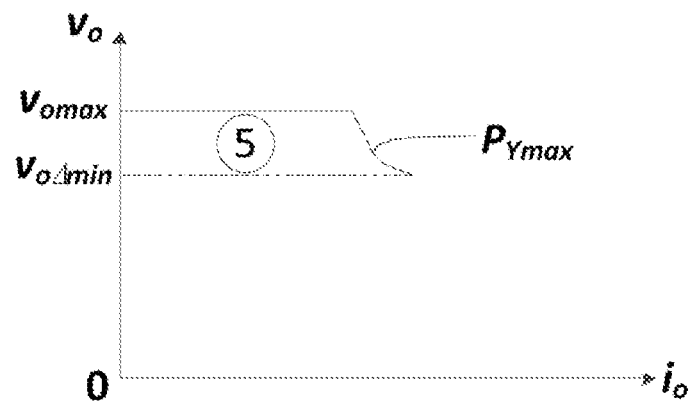
FIG. 6b is a schematic diagram of a fifth area condition according to an embodiment of the present application.

A fifth area condition is that the voltage of the DC power terminal is greater than or equal to the second voltage threshold, and less than or equal to a maximum voltage threshold, and the power of the DC power terminal is less than or equal to the first power threshold, that is: the second voltage threshold ($v_{o\Delta min}$)≤the voltage of the DC power terminal≤the maximum voltage threshold ($v_{omax}$), and the power of the DC power terminal≤the first power threshold ($P_{Ymax}$). Referring to FIG. 6b for details, which is a schematic diagram of a fifth area condition according to an embodiment of the present application. The controller is further configured to control the star/delta switching unit to form a delta connection or a star connection when the voltage and power of the DC power terminal satisfies the fifth area condition.

Figure 6C:
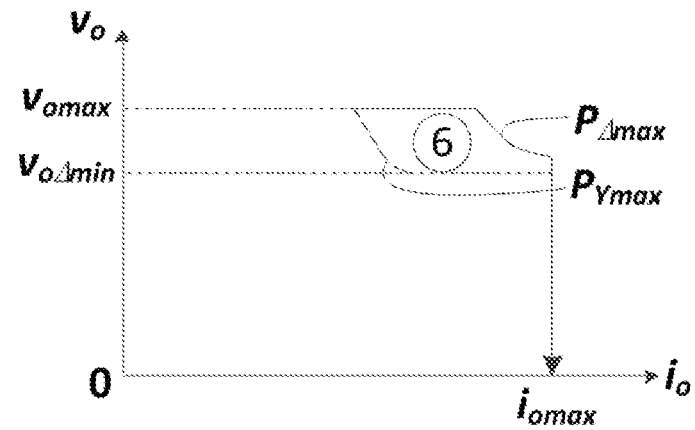
FIG. 6c is a schematic diagram of a sixth area condition according to an embodiment of the present application.

A sixth area condition is that the voltage of the DC power terminal is greater than or equal to the second voltage threshold, and less than or equal to the maximum voltage threshold, and the power of the DC power terminal is greater than the first power threshold, and less than or equal to a second power threshold, that is: the second voltage threshold ($v_{o\Delta min}$)≤the voltage of the DC power terminal≤the maximum voltage threshold ($v_{omax}$), and the first power threshold ($P_{Ymax}$)<the power of the DC power terminal≤the second power threshold ($P_{\Delta max}$). Referring to FIG. 6c for details, which is a schematic diagram of a sixth area condition according to an embodiment of the present application. The controller is further configured to control the star/delta switching unit to form a delta connection when the voltage and power of the DC power terminal satisfies the sixth area condition.

In some embodiments, the first voltage threshold ($v_{oYmin}$) is a minimum DC output voltage of the DC power terminal measured in advance under the star connection; the second voltage threshold ($v_{o\Delta min}$) is a minimum DC output voltage of the DC power terminal measured in advance under the delta connection; the maximum voltage threshold value ($v_{omax}$) is a maximum DC output voltage of the DC power terminal measured in advance; the first power threshold ($P_{Ymax}$) is a maximum output power of the DC power terminal measured in advance under the star connection; and the second power threshold ($P_{\Delta max}$) is a maximum output power of the DC power terminal measured in advance under the delta connection. It should be noted that each of the above thresholds may also be directly set in advance according to the converter parameters or may be set according to an individual's needs.

In the embodiments with the presentation of the intermediate DC bus and an isolated DC/DC subunit below, when a DC-Link voltage and the isolated DC/DC subunit have narrow adjusting ranges, the third voltage threshold ($v_{oYPmin}$) the second voltage threshold ($v_{o\Delta min}$). In some embodiments, the first power conversion unit, the second power conversion unit, and the third power conversion unit includes boost type AC/DC subunits.

In some embodiments shown in FIG. 3 and FIG. 5, the controller may be configured to control the star/delta switching unit to form a delta connection or a star connection when the voltage of the DC power terminal satisfies the second area condition or the fifth area condition, so that the efficiency of the power converter can reach a preset range. It should be understood that the efficiency of the power converter=a power of the DC power terminal/a power of the AC power terminal. The connection mode may be determined according to an actual efficiency requirement. When the star connection is used for operation in the case where the second area condition or the fifth area condition is satisfied, the maximum output power will be limited and the output power the first power threshold ($P_{Ymax}$).

Based on the foregoing various embodiments, the controller may be further configured to control, a gain of the first power conversion unit, a gain of the second power conversion unit, and a gain of the third power conversion unit according to the signal reflecting the voltage of the DC power terminal, thereby a voltage range of the DC power terminal can be changed.

In some embodiments, the first power conversion unit, the second power conversion unit, and the third power conversion unit may have same circuit structure, and there may be various kinds of circuit structures, and the structures of the first power conversion unit, the second power conversion unit and the third power conversion unit will be illustrated below by way of examples.

Figure 7:
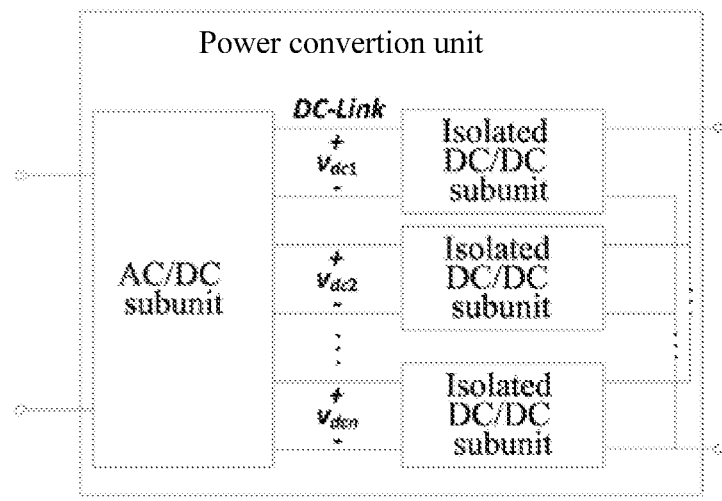
FIG. 7 is a schematic structural diagram of a power conversion unit according to an embodiment of the present application.

Referring to FIG. 7, which is a schematic structural diagram of a power conversion unit according to an embodiment of the present application. The structure of the power conversion unit shown in FIG. 7 may be the structure of the first power conversion unit, the second power conversion unit, and the third power conversion unit. As shown in FIG. 7, each of the first power conversion unit, the second power conversion unit, and the third power conversion unit includes an AC/DC subunit, an intermediate DC bus (DC-Link), and an isolated DC/DC subunit. In the following, an example is taken where the structure shown in FIG. 7 is the first power conversion unit.

Referring to FIG. 7, an AC terminal of the AC/DC subunit is connected to the three-phase AC terminal through the star/delta switching unit. The AC/DC subunit includes at least one DC terminal which constitutes the intermediate DC bus, and the AC/DC subunit is connected to a first terminal of the isolated DC/DC subunit through the intermediate DC bus, and a second terminal of the isolated DC/DC subunit is connected to the DC power terminal.

The DC-Link voltage (Vdc1, Vdc2, ..., Vdcn) can be adjusted by the star/delta switching unit, gain adjustment of the AC/DC subunit and gain adjustment of the isolated DC/DC subunit, a maximum voltage range is determined together by voltage stresses of the switches, a type of the AC/DC subunit, and a range of the three-phase AC input voltage. Taking the AC/DC subunit including n DC-Link ports as an example: when the AC/DC subunit employs a boost topology, a lower limit of the DC-Link voltage is 1/n of an input voltage peak value of the first power conversion unit, the second power conversion unit, and the third power conversion unit, an upper limit is a withstand voltage value of the switches; and when the AC/DC subunit employs a buck topology, the upper limit of the DC-Link voltage is 1/n of the input voltage peak value of the first power conversion unit, the second power conversion unit, and the third power conversion unit. The DC-link acts as an intermediate link that connects the AC/DC subunit and the isolated DC/DC subunit, and adjusts their voltages. Combined with the switching of the star/delta switching unit and the gain adjustment of the isolated DC/DC subunit, the voltage range of the DC power terminal can be broadened.

Wherein, adjustment of a gain of the isolated DC/DC subunit is determined according to a DC-Link voltage and a voltage of the DC power terminal. Since there are more boost type AC/DC subunits in engineering applications, the subsequent embodiments are illustrated by taking an example where the AC/DC subunit is a boost circuit.

In the embodiment shown in FIG. 7, the controller can control the star/delta switching unit according to requirements of the DC output voltage, and combined with the adjustment of the DC-Link voltage and the adjustment of the voltage gain of the isolated DC/DC subunit to realize a wide range of DC output voltage, so the DC power terminal can be directly connected to a DC load or a power equipment with wide voltage range without adding redundant conversion units, thus having advantages of a high power density, a low cost and a high efficiency, and the like.

Figure 8:
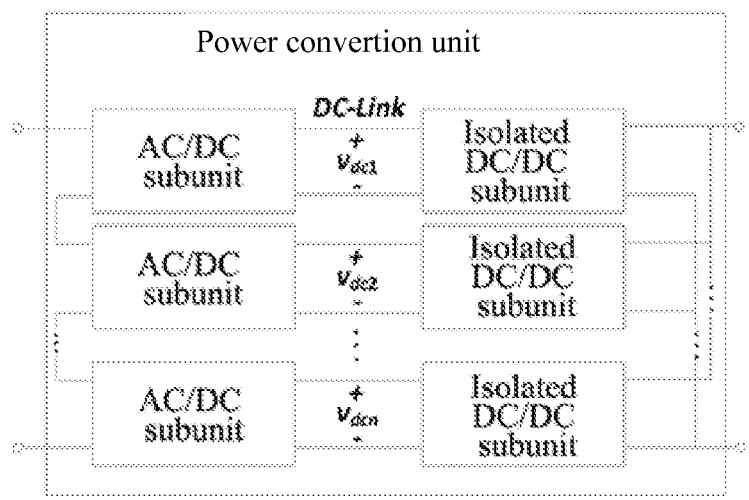
FIG. 8 is a schematic structural diagram of another power conversion unit according to an embodiment of the present application.

The number of the AC/DC subunits and the isolated DC/DC subunits shown in FIG. 7 may be one or more. Referring to FIG. 8, which is a schematic structural diagram of another power conversion unit according to an embodiment of the present application. Each of the first power conversion unit, the second power conversion unit, and the third power conversion unit includes multiple AC/DC subunits and multiple isolated DC/DC subunits. As shown in the figure, the number of the AC/DC subunits and the number of the isolated DC/DC subunits are the same and have a one-to-one correspondence therebetween. AC terminals of the multiple AC/DC subunits are connected to each other in series, and DC terminals of the AC/DC subunits are respectively connected to first terminals of the isolated DC/DC subunits in one-to-one correspondence. It can be understood that the DC terminal of each AC/DC subunit is cascaded with its corresponding isolated DC/DC subunit.

In some embodiments, for example, the first power conversion unit, the second power conversion unit, and the third power conversion unit may adopt the structure shown in FIG. 7 or FIG. 8, and the signal reflecting the voltage of the DC power terminal obtained by the controller, for example, can also be a voltage on the intermediate DC bus (DC-link voltage).

On the basis of the embodiments shown in FIG. 7 or FIG. 8, second terminals of all the isolated DC/DC subunits in the first power conversion unit, the second power conversion unit, and the third power conversion unit are connected in series with each other or in parallel to the DC power terminal. A connection mode of the DC terminals of the isolated DC/DC subunits of each phase includes but is not limited to:

1) All connected in parallel, and connected in series or in parallel with DC terminals of the other two phases;

2) All connected in series, and connected in series or in parallel with DC terminals of the other two phases;

3) n subunits of each phase are equally divided into k groups, and units in each group are connected in series and then connected in parallel with the other groups or the units in each group are connected in parallel and then connected in series with the other groups, and the constituted DC terminals are connected in series or in parallel with DC terminals of the other two phases;

4) n subunits of each phase are equally divided into k groups, units in each group are connected in series and then connected in series or in parallel with the groups of the other phases, or the units in each group are connected in parallel and then connected in series or in parallel with the groups of the other phases, and the constituted DC terminals are connected in series or in parallel with the other remaining DC terminals.

Figure 9:
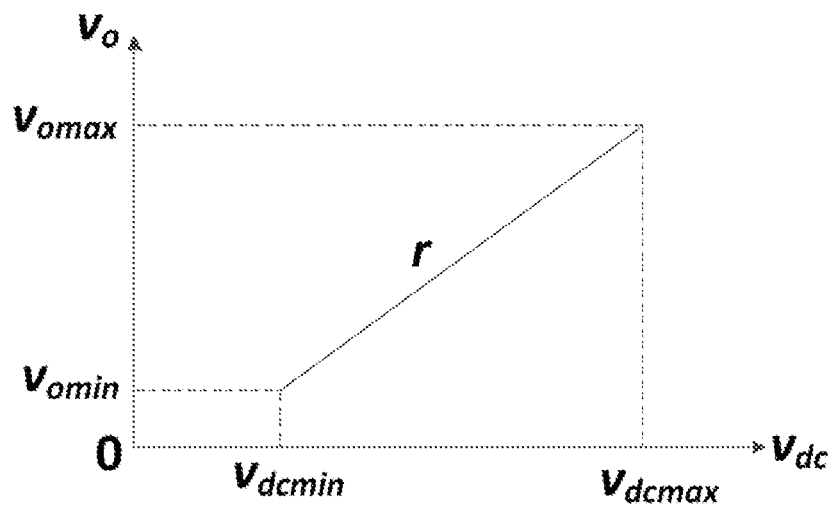
FIG. 9 is an example of voltage adjustment for an intermediate DC bus according to an embodiment of the present application.

Based on the various embodiments shown in FIG. 7 or FIG. 8 above, the controller is further configured to adjust the gain of the AC/DC subunit or the gain of the isolated DC/DC subunit according to the signal reflecting the voltage of the DC power terminal, adjust the range of the DC-link voltage to broaden the voltage range of the DC power terminal. Referring to FIG. 9, which is an example of adjusting a DC-link voltage according to an embodiment of the present application. For example, the AC/DC subunit is a boost type circuit, the structure of the star/delta switching unit is not limited, and the structure of the isolated DC/DC subunit is not limited. $v_{omin}$ and $v_{omax}$ shown in FIG. 9 are the lowest and highest DC output voltages in the case of the star or delta connection, and $v_{dcmin}$ and $v_{dcmax}$ are the lowest and highest DC-Link voltages in the case of the star or delta connection. When the voltage gain of the isolated DC/DC subunit is fixed to r, $v_o$ represents a DC output voltage, and $v_{dc}$ represents a DC-Link voltage. According to the DC output voltage, in a determined connection mode, an adjustment area of the DC-Link voltage is a diagonal as shown in FIG. 9.

In FIG. 9, when the star/delta switching unit is in the star connection mode, the range of the DC-Link voltage is: $[v_{dcYmin}, v_{dcmax}]$, wherein $v_{dcmax}$ is determined by the switching stress, $v_{dcYmin} = \sqrt{2}\ V_{grms}/n$, $V_{grms}$ is an effective value of a grid phase voltage, n is the number of DC-Link per phase. When the star/delta switching unit is in the delta connection mode, the range of the DC-Link voltage is: $[v_{dc\Delta min}, v_{dcmax}]$, wherein $v_{dcmax}$ is determined by the switching stress, $v_{dc\Delta min} = \sqrt{3}\ v_{dcYmin}$, and the power is increased to times that of the star connection mode.

Combining the control of the star/delta switching unit with the adjustment of the DC-Link voltage in the embodiment shown in FIG. 9 can increase the working range of the DC-Link voltage and further broaden the voltage and power range of the DC terminal. Moreover, by fixing the voltage gain of the isolated DC/DC subunit, it is also possible to improve the working efficiency when the DC/DC subunit employs a resonant converter topology. Wherein, a voltage on a second terminal of each isolated DC/DC subunit is equal to the DC-link voltage multiplied by the voltage gain of the isolated DC/DC subunit.

Figure 10A:
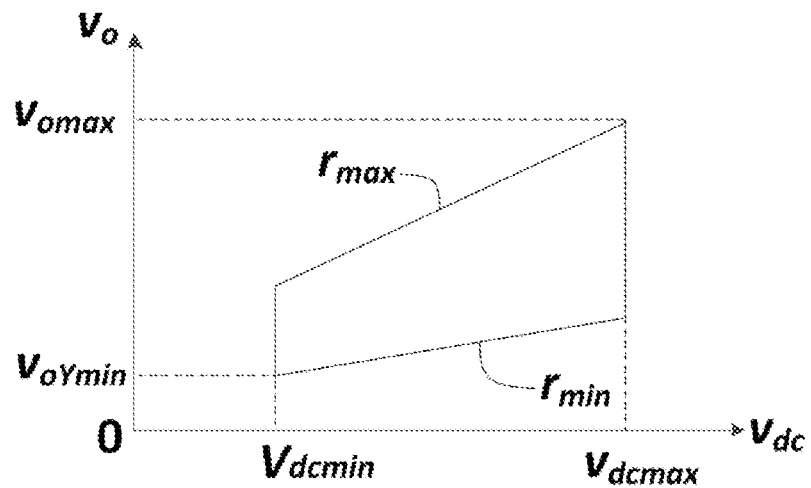
FIG. 10a is a schematic diagram of adjusting a DC-link voltage according to a voltage of a DC power terminal and a voltage gain of an isolated DC/DC subunit according to an embodiment of the present application.
Figure 10B:
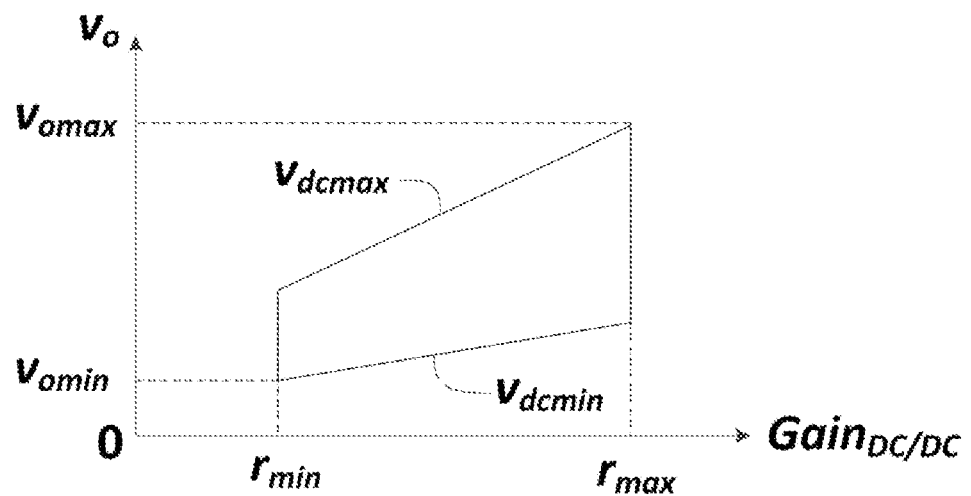
FIG. 10b is a schematic diagram of adjusting a voltage gain of an isolated DC/DC subunit according to a voltage of a DC power terminal and a DC-link voltage according to an embodiment of the present application.

Combining the control of the star/delta switching unit with the adjustment of the DC-Link voltage and the adjustment of the voltage gain of the isolated DC/DC subunit to broaden the voltage range of the DC terminal is illustrated below. Referring to FIG. 10a, which is a schematic diagram of adjusting a DC-link voltage according to the voltage of the DC power terminal and a gain of an isolated DC/DC subunit according to an embodiment of the present application. Referring to FIG. 10b, which is a schematic diagram of adjusting a voltage gain of an isolated DC/DC subunit according to a voltage of a DC power terminal and a range of a DC-link voltage according to an embodiment of the present application. Combining the switching of the star-delta switching unit and the adjustment of the DC-Link voltage, the range of the DC-Link voltage can be broadened as shown in FIG. 10b: $[v_{dcmin}, v_{dcmax}]$. If the voltage gain of the isolated DC/DC subunit ($Gain_{DC/DC}$) is fixed to r, the voltage range of the DC power terminal is $[rv_{dcmin}, rv_{dcmax}]$. Further, when the voltage gain of the isolated DC/DC subunit is adjusted within a range of $[r_{min}, r_{max}]$, the range of the DC output voltage can be broadened to $[v_{omin}, v_{omax}]=[r_{min}v_{dcmin}, r_{max}v_{dcmax}]$, apparently $[rv_{dcmin}, rv_{dcmax}] \square [v_{omin}, v_{omax}]=[r_{min}v_{dcmin}, r_{max}v_{dcmax}]$, thus combining the switching of the star/delta switching unit with the adjustment of the DC-Link voltage, and the adjustment of the voltage gain of the isolated DC/DC subunit can broaden the voltage range of the DC power terminal.

In the above embodiments, the AC/DC subunit may be a series double half-bridge topology circuit, a midpoint clamped multi-level half-bridge circuit, a midpoint clamped multi-level full-bridge circuit, a flying capacitor type multi-level half-bridge circuit or a flying capacitor type multi-level full-bridge circuit, which is not limited herein.

Figure 11:
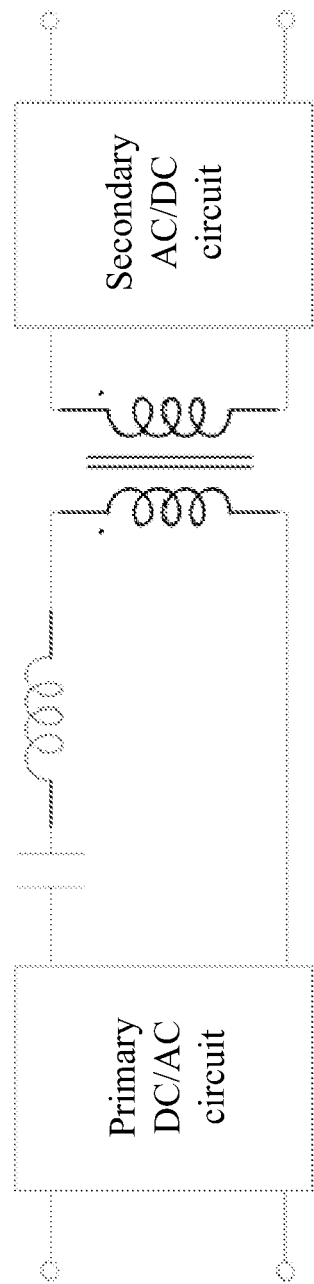
FIG. 11 is a schematic structural diagram of an isolated DC/DC subunit according to an embodiment of the present application.

With respect to the isolated DC/DC subunit in the above embodiments, it may be of various structures. Referring to FIG. 11, which is a schematic structural diagram of an isolated DC/DC subunit according to an embodiment of the present application. As shown in FIG. 11, the isolated DC/DC subunit may include: a primary DC/AC circuit, a passive network, a high frequency transformer, and a secondary AC/DC circuit. The primary DC/AC circuit is connected to a primary winding of the high frequency transformer through the passive network, and a secondary winding of the high frequency transformer is connected to the secondary AC/DC circuit; and a DC terminal of the primary DC/AC circuit is connected to the DC terminal of the AC/DC subunit, and a DC terminal of the secondary AC/DC circuit is connected to the DC power terminal.

The passive network shown in FIG. 11 may be a series resonant network, a parallel resonant network, or only have an inductive unit, and is not limited thereto. The secondary AC/DC circuit shown in FIG. 11 may be a full-bridge rectifier circuit, a full wave rectifier circuit, or an uncontrolled rectifier circuit, and is not limited thereto.

The primary DC/AC circuit may include but is not limited to a two-level half-bridge circuit, a two-level full-bridge circuit, a diode midpoint clamped multi-level half-bridge circuit, an active midpoint clamped multi-level half-bridge circuit, a T-type three-level midpoint clamped multi-level half-bridge circuit, a flying capacitor type multi-level half-bridge circuit, a flying capacitor type multi-level full-bridge circuit or a series double-half bridge circuit, and is not limited thereto.

Figure 12:
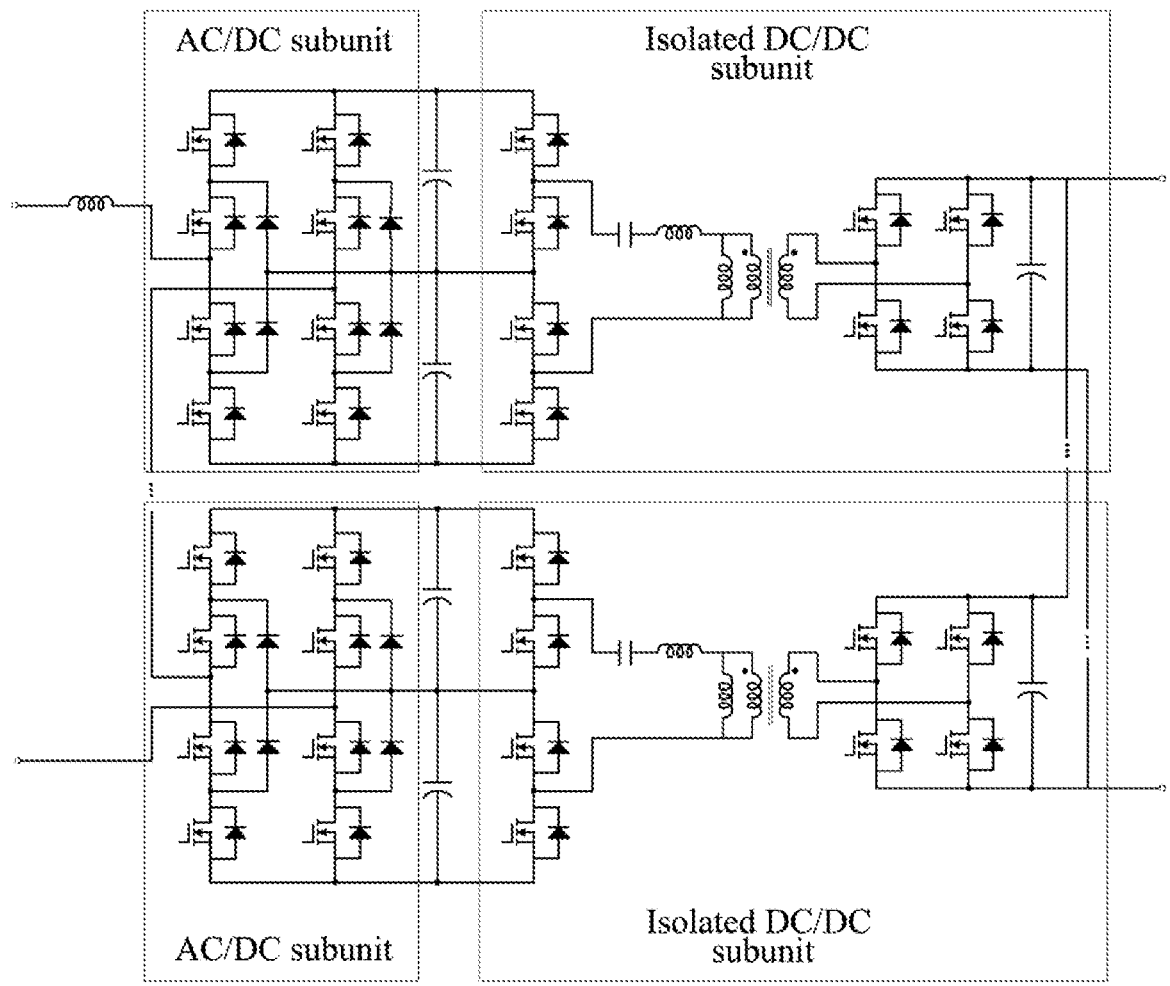
FIG. 12 is a circuit example of a first power conversion unit of a power converter according to an embodiment of the present application.

Referring to FIG. 12, which is an example of an overall circuit of a first power conversion unit of a power converter according to an embodiment of the present application. The structure shown in FIG. 12 is an example of the first power conversion unit, the second power conversion unit and the third power conversion unit may be implemented with the circuit structure shown in FIG. 12, and details are not described herein. As shown in FIG. 12, the AC/DC subunit of each phase can be composed of multiple diode midpoint clamped three-level full-bridge circuits connected in series at the AC terminals; two capacitors are connected in series to form the DC-Link at the output of each three-level full-bridge circuit; the isolated DC/DC subunit includes a primary series double half-bridge circuit, the passive network composed of inductors and capacitors, high frequency transformers, and a secondary two-level full-bridge circuit, and second terminals of all isolated DC/DC subunits are connected in parallel.

In the above embodiments, the controller adjusts the gain of the isolated DC/DC subunit by changing a modulation mode of the isolated DC/DC subunit and/or adjusting the switching frequency. Wherein, the modulation mode of the isolated DC/DC subunit is symmetric modulation or asymmetric modulation. For example, in the isolated DC/DC subunit of the embodiment shown in FIG. 12, when the primary DC/AC circuit is a series double half-bridge circuit, the range of the voltage gain can be broadened by utilizing the symmetric modulation and asymmetric modulation, and under the same switching frequency, the gain of the asymmetric modulation is less than the gain of the symmetric modulation.

When the isolated DC/DC subunit shown in FIG. 12 adopts the symmetric modulation mode or the asymmetric modulation mode, and the gain of the asymmetric modulation mode is continuously adjustable, the working range is as shown in Table 1, where combining the changing of the modulation mode with the adjustment of the switching frequency. Wherein, $r_{max}$ is a maximum gain of the isolated DC/DC subunit in the symmetrical modulation mode, and $r_{min}$ is a minimum gain of the isolated DC/DC subunit in the asymmetric modulation.

TABLE 1

| \ | Range of DC-Link Voltage | Range of a voltage gain of an isolated DC/DC subunit | DC output voltage | Working area |
|---|---|---|---|---|
| Star connection | $[v_{dcYmin}, v_{dcmax}]$ | $[r_{min}, r_{max}]$ | $[v_{oYmin}, v_{omax}]$ | Area A1 |
| Delta connection | $[\sqrt{3}v_{dcYmin}, v_{dcmax}]$ | $[r_{min}, r_{max}]$ | $[v_{o\Delta min}, v_{omax}]$ | Area A2 |

In Table 1, $v_{oYmin}=r_{min} \cdot v_{dcYmin}$, $v_{omax}=v_{dcmax} \cdot r_{max}$, $v_{o\Delta min}=\sqrt{3}v_{dcYmin} \cdot r_{min}$.

It should be noted that an overlapping area of two working areas (the area A1 and the area A2) is a working area in which both of the star connection and the delta connection mode can work, and the criteria for selecting the working mode in said area may be:

1) When the voltage ranges of the DC power terminal in the star connection and the delta connection mode both meet voltage requirement, the connection mode is determined according to the principle of efficiency priority. For example, in the case where a conduction loss is dominant, the delta connection mode is preferred.

2) In the same area, it is necessary to consider the efficiency to determine a combination mode of the DC-Link voltage and the voltage gain of the isolated DC/DC subunit. For example, in the case where the isolated DC/DC subunit is a resonant converter, and the voltage gain is equal to the high frequency transformer ratio, the efficiency is optimal. Therefore, it is necessary to adjust the voltage gain of the isolated DC/DC subunit to be close to the high frequency transformer ratio, and the DC-Link voltage is correspondingly adjusted according to the voltage of the DC power terminal and the voltage gain of the isolated DC/DC subunit.

For example, embodiment of FIG. 12 is applied to a 13.2 kV medium voltage grid. And each phase includes 15 AC/DC subunits connected in series, and uses switches of 1200V. For specific values of the embodiments shown in FIG. 13a and FIG. 13b, reference may be made to an example shown in Table 2 below. A minimum DC-Link voltage is a peak value of the input grid voltage divided by the number of the AC/DC subunits in series, 718V under the star connection and 1244V under the delta connection.

Considering the voltage stress of the 1200V switching device, the maximum DC-Link voltage is set to a half bus voltage of 790V and an entire bus voltage of 1580V. The gain of the isolated DC/DC subunit=a gain in a current modulation mode x a gain in a current switching frequency, when a symmetric modulation is used, the gain range is broadened to 0.5×[0.9n, n] (0.5 is the gain in the symmetric modulation mode) by adjusting the switching frequency of the isolated DC/DC subunit, to ensure that it can acquire a better efficiency. In this embodiment, for example, a boost ratio of the transformer takes n=4/3, so the range of the voltage gain of the isolated DC/DC subunit is: [0.6, 0.665].

Figure 13A:
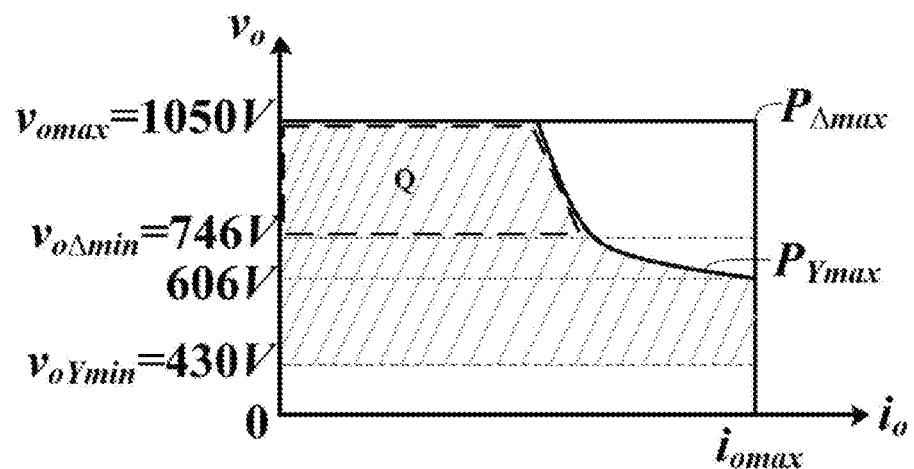
FIG. 13a is a schematic diagram of a working area A1 corresponding to Table 2 according to an embodiment of the present application.
Figure 13B:
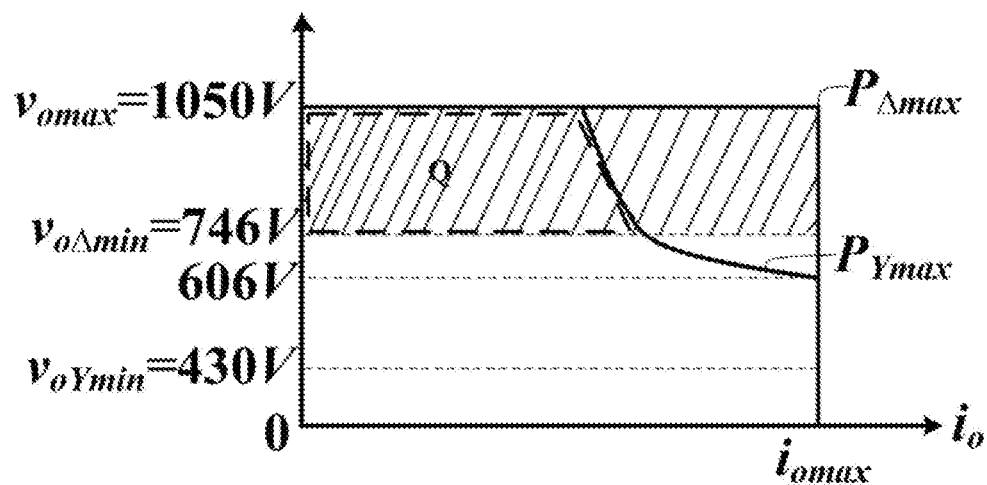
FIG. 13b is a schematic diagram of a working area A2 corresponding to Table 2 according to an embodiment of the present application.

Referring to FIG. 13a, which is a schematic diagram of a working area A1 corresponding to Table 2 according to an embodiment of the present application. An area filled with diagonals in FIG. 13a is the working area A1. Referring to FIG. 13b, which is a schematic diagram of a working area A2 corresponding to Table 2 according to an embodiment of the present application. An area filled with diagonals in FIG. 13b is the working area A2. It should be noted that an overlapping area Q of the two working areas in FIG. 13a and FIG. 13b is a working area in which both of the star connection and the delta connection can work.

Since the working area A1 filled with diagonals in FIG. 13a has a wider range of DC-Link voltage, the corresponding voltage of the DC power terminal is also wider, ranging from 430V to 1050V Since the working area A2 filled with diagonals in FIG. 13b has a narrower range of DC-Link voltage, the corresponding voltage of the DC power terminal is also narrower, ranging from 746V to 1050V

TABLE 2

| \ | Range of DC-Link Voltage | Range of voltage gain of an isolated DC/DC subunit | DC output voltage | Working area |
|---|---|---|---|---|
| Star connection | 718 V~ 1580 V | 0.6~0.665 | 430 V~ 1050 V | Area A1 |
| Delta connection | 1244 V~ 1580 V | 0.6~0.665 | 746 V~ 1050 V | Area A2 |

When the series double half-bridge circuit of the isolated DC/DC subunit shown in FIG. 12 adopts the symmetric modulation mode and a gain-fixed asymmetric modulation mode, and the gain of the symmetric modulation mode is k times of the gain of the gain-fixed asymmetric modulation mode, the corresponding voltage range is shown in Table 3. In each working area, the switching between the star connection and the delta connection and the switching of the modulation mode of the isolated DC/DC subunit are not involved, only the adjustment of the DC-Link voltage and the adjustment of the voltage gain of the isolated DC/DC subunit implemented by adjusting the switching frequency under a fixed modulation mode are involved (for the isolated DC/DC subunit, its voltage gain can be determined together by adjusting the modulation mode and adjusting the switching frequency, the gain of DC/DC subunit=the gains in different modulation modes x the gains in different switching frequencies).

TABLE 3

| \ | Range of the DC-Link voltage | Modulation mode of the isolated DC/DC subunit | Range of the voltage gain of the isolated DC/DC subunit | DC output voltage | Working area |
|---|---|---|---|---|---|
| Star connection | $[v_{dcYmin}, v_{dcmax}]$ | Asymmetric modulation | $[r_{min}, r_{max}]$ | $[v_{oYmin1}, v_{omax1}]$ | B1 |
| | | Symmetric modulation | $[k \cdot r_{min}, k \cdot r_{max}]$ (k > 1) | $[v_{oYmin2}, v_{omax2}]$ | B2 |
| Delta connection | $[\sqrt{3} v_{dcYmin}, v_{dcmax}]$ | Asymmetric modulation | $[r_{min}, r_{max}]$ | $[v_{o\Delta min1}, v_{omax1}]$ | B3 |
| | | Symmetric modulation | $[k \cdot r_{min}, k \cdot r_{max}]$ (k > 1) | $[v_{o\Delta min2}, v_{omax2}]$ | B4 |

Wherein, for multiple overlapping areas of the four working areas shown in Table 3, the criteria for a preferred working mode is:

1) When the voltage of the DC power terminal under the symmetric modulation and the asymmetric modulation mode both satisfy the output voltage requirement (for example, $v_{omax1} \geq v_{oYmin2}$, in the range of $[v_{oYmin2}, v_{omax1}]$), since the asymmetric modulation will cause problems in terms of uneven losses and soft switching, the symmetric modulation mode is preferred to be used.

2) When the voltage of the DC power terminal under the star connection and the delta connection mode both meet output voltage requirements, the connection mode is determined according to the principle of efficiency priority.

3) In the same area, efficiency needs to be considered to determine the combination mode of the DC-Link voltage and the voltage gain of the isolated DC/DC subunit.

Figure 14A:
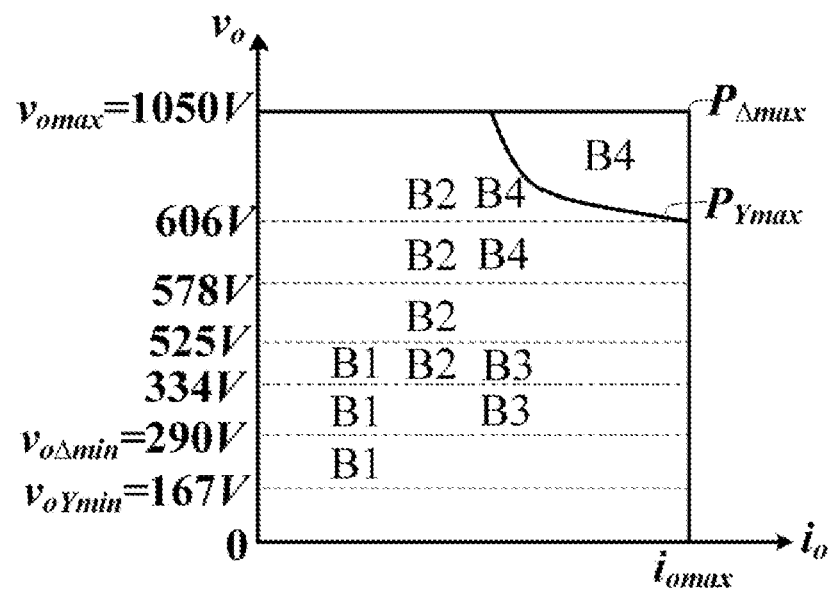
FIG. 14a is a schematic diagram of working areas B1 to B4 corresponding to Table 4 according to an embodiment of the present application.
Figure 14B:
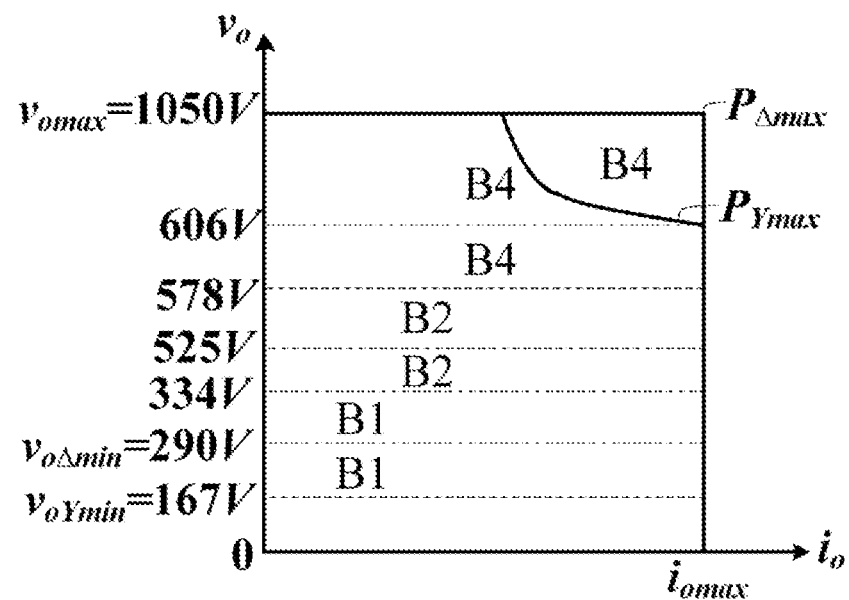
FIG. 14b is a schematic diagram of working areas B1, B2, and B4 corresponding to Table 4 according to an embodiment of the present application.

FIG. 14a and FIG. 14b show an embodiment with example specific values. Similarly, the primary DC/AC circuit of the isolated DC/DC subunit can adopt the symmetric modulation mode and the asymmetric modulation mode to broaden the gain range of the primary DC/AC circuit to two sets of fixed gains: 0.25 (asymmetric modulation gain) and 0.5 (symmetric modulation gain). After determining the modulation mode, the gain range is broadened to [0.9n, n] by adjusting the switching frequency of the isolated DC/DC subunit, and can be further broadened to [0.7n, n] with appropriate efficiency sacrifice. In this embodiment, the boost ratio of the transformer is n=4/3, so the widest voltage range in different switching frequencies is: [0.93, 1.33], and the gain of DC/DC subunit=the gains in different modulation modes x the gains in different switching frequencies. The specific range is shown in Table 4 below and in FIG. 14a corresponding to Table 4.

TABLE 4

|  | Range of the DC-Link Voltage | Modulation mode of the isolated DC/DC subunit | Range of the voltage gain of an isolated DC/DC subunit | DC output voltage | Working area |
|---|---|---|---|---|---|
| Star connection | 718 V~1580 V | Asymmetric modulation | 0.233~0.333 | 167~525 V | B1 |
|  |  | Symmetric modulation | 0.465~0.665 | 334~1050 V | B2 |
| Delta connection | 1244 V~1580 V | Asymmetric modulation | 0.233~0.333 | 290~525 V | B3 |
|  |  | Symmetric modulation | 0.465~0.665 | 578~1050 V | B4 |

As can be seen from the above embodiments, the range of the voltage gain of the isolated DC/DC subunit has multiple gain areas. For example, when asymmetric modulation modes of multiple different gains are operable, the gain areas are overlapped or not overlapped among each other, which can all be combined with the switching of the star/delta switching unit and the adjustment of the DC-Link voltage to broaden the voltage range of the DC power terminal. For the isolated DC/DC subunit, the symmetric modulation mode is preferred; when the asymmetric modulation mode is adopted, the asymmetric modulation mode with the maximum gain is used as far as possible. In some embodiments, for example, the symmetric modulation mode is preferentially selected, and a redundant working area B3 is abandoned, and a selected range can be obtained as shown in FIG. 14b. In order to increase the voltage range of the DC power terminal, an embodiment is shown in FIG. 14b, for example, in a working area B1, the asymmetric modulation mode of the isolated DC/DC subunit is selected, and the modulation mode of the isolated DC/DC subunit is switched to the symmetric modulation when entering working areas B2 and B4. Moreover, in the working areas B1, B2, the star/delta switching unit adopts the star connection; and when entering the work area B4, the star/delta switching unit switches to the delta connection.

Figure 15A:
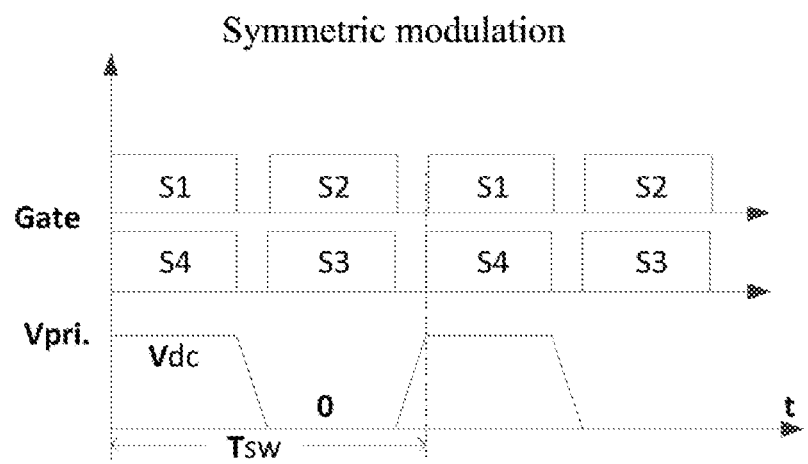
FIG. 15a is an example of a symmetric modulation mode according to an embodiment of the present application.
Figure 15B:
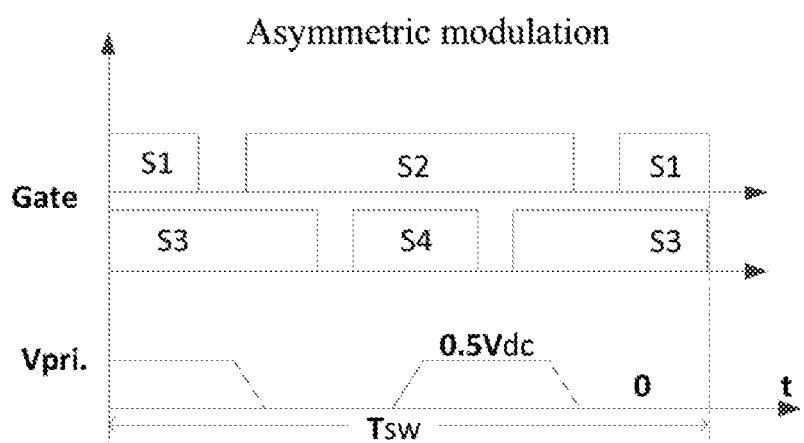
FIG. 15b is an example of an asymmetric modulation mode according to an embodiment of the present application.

Referring to FIG. 15a, which is an example of a symmetric modulation mode according to an embodiment of the present application. In FIG. 15a, driving signals of the switches are symmetrical, and the modulation gain is higher. Referring to FIG. 15b, which is an example of an asymmetric modulation mode according to an embodiment of the present application. In FIG. 15a, driving signals of the switches are asymmetrical, and the modulation gain is lower than that of the symmetric modulation mode.

On the basis of the foregoing various embodiments, the embodiment of the present application further provides a power supply system, which may include the power converter according to any one of the foregoing embodiments, where the AC terminals of the power converter are connected to the grid directly or connected to the grid through a filter, the DC terminal is connected to a load or a power equipment. In some embodiments, the load or power equipment is a rechargeable battery, a photovoltaic panel, a super capacitor, a DC power supply, DC/AC converter or DC/DC converter.

In the present application, unless specifically regulated and defined otherwise, the terms "installation", "connected", "connecting", "fixed" and the like should be understood broadly, and may be, for example, a fixed connection or a detachable connection, or can become one flesh; it can be a mechanical connection, or it can be electrically connected or can communicate with each other; and it can be directly connected, or indirectly connected through an intermediate medium, can make an internal connection of two components or an interaction of two components. For those skilled in the art, the specific meanings of the above terms in the present application can be understood according to specific situations.

Finally, it should be noted that the above embodiments are merely intended for describing, rather than limiting, the technical solutions of the present application; although the present application has been described in detail with reference to the foregoing embodiments, those skilled in the art will understand that they may still make modifications to the technical solutions described in the foregoing embodiments, or make equivalent substitutions to some or all of the technical features therein; and the modifications or substitutions do not make the essence of the corresponding technical solutions deviate from the scope of the technical solutions in the embodiments of the present application.

What is claimed is:

1. A power converter, comprising: a star/delta switching unit, a first power conversion unit, a second power conversion unit, a third power conversion unit, and a controller;
   alternating current (AC) terminals of the first power conversion unit, the second power conversion unit, and the third power conversion unit are connected to a three-phase AC terminal through the star/delta switching unit, direct current (DC) terminals of the first power conversion unit, the second power conversion unit and the third power conversion unit are connected to a DC power terminal;
   wherein the controller is configured to control the star/delta switching unit according to a signal reflecting a voltage of the DC power terminal, and the star/delta switching unit is configured to form a star connection or a delta connection among the three-phase AC terminal and the first power conversion unit, the second power conversion unit and the third power conversion unit.

2. The power converter according to claim 1, wherein the star/delta switching unit comprises: a first delta switch, a second delta switch, a third delta switch, a first star switch, a second star switch, and a third star switch;
   a first phase line of the three-phase AC terminal is connected to a first AC terminal of the first power conversion unit, and is connected to a second AC terminal of the third power conversion unit through the first delta switch;
   a second phase line of the three-phase AC terminal is connected to a first AC terminal of the second power conversion unit, and is connected to a second AC terminal of the first power conversion unit through the second delta switch;

a third phase line of the three-phase AC terminal is connected to a first AC terminal of the third power conversion unit, and is connected to a second AC terminal of the second power conversion unit through the third delta switch;

wherein the second AC terminal of the first power conversion unit is connected to a neutral node through the second star switch, the second AC terminal of the second power conversion unit is connected to the neutral node through the third star switch, and the second AC terminal of the third power conversion unit is connected to the neutral node through the first star switch.

3. The power converter according to claim 1, wherein the controller is configured to control the star/delta switching unit to form the star connection when the signal reflecting the voltage of the DC power terminal satisfies a first area condition, wherein the first area condition is that the signal reflecting the voltage of the DC power terminal is greater than or equal to a first voltage threshold and less than a second voltage threshold.

4. The power converter according to claim 1, wherein the controller is further configured to control the star/delta switching unit to form the delta connection or the star connection when the signal reflecting the voltage of the DC power terminal satisfies a second area condition, wherein the second area condition is that the signal reflecting the voltage of the DC power terminal is greater than or equal to a second voltage threshold, and less than or equal to a maximum voltage threshold, and a power of the DC power terminal is less than or equal to a first power threshold.

5. The power converter according to claim 4, wherein the controller is configured to control the star/delta switching unit to form the delta connection or the star connection when the signal reflecting the voltage of the DC power terminal satisfies the second area condition or the fifth area condition according to an actual efficiency requirement.

6. The power converter according to claim 1, wherein the controller is configured to control the star/delta switching unit to form the star connection when the signal reflecting the voltage of the DC power terminal satisfies a fourth area condition, wherein the fourth area condition is that the signal reflecting the voltage of the DC power terminal is greater than or equal to a first voltage threshold, and less than a second voltage threshold, and a power of the DC power terminal is less than or equal to a first power threshold.

7. The power converter according to claim 6, wherein the controller is further configured to control the star/delta switching unit to form the delta connection or the star connection when the signal reflecting the voltage of the DC power terminal satisfies a fifth area condition, wherein the fifth area condition is that the signal reflecting the voltage of the DC power terminal is greater than or equal to the second voltage threshold, and less than or equal to a maximum voltage threshold, and the power of the DC power terminal is less than or equal to the first power threshold.

8. The power converter according to claim 7, wherein the controller is further configured to control the star/delta switching unit to form the delta connection when the signal reflecting the voltage of the DC power terminal satisfies a sixth area condition, wherein the sixth area condition is that the signal reflecting the voltage of the DC power terminal is greater than or equal to the second voltage threshold, and less than or equal to the maximum voltage threshold, and the power of the DC power terminal is greater than the first power threshold, and less than or equal to a second power threshold.

9. The power converter according to claim 1, wherein the signal reflecting the voltage of the DC power terminal comprises: a sampled voltage of the DC power terminal or a preset voltage of the DC power terminal.

10. The power converter according to claim 1, wherein the controller is further configured to control the star/delta switching unit to form the delta connection when the signal reflecting the voltage of the DC power terminal satisfies a third area condition, wherein the third area condition is that the signal reflecting the voltage of the DC power terminal is greater than or equal to a third voltage threshold and less than or equal to a maximum voltage threshold, and a power of the DC power terminal is greater than a first power threshold, and less than or equal to a second power threshold.

11. The power converter according to claim 1, wherein the controller is further configured to control a gain of the first power conversion unit, a gain of the second power conversion unit, and a gain of the third power conversion unit according to the signal reflecting the voltage of the DC power terminal.

12. The power converter according to claim 1, wherein each of the first power conversion unit, the second power conversion unit, and the third power conversion unit comprises: an AC/DC subunit, an intermediate DC bus, and an isolated DC/DC subunit;

wherein an AC terminal of the AC/DC subunit is connected to the three-phase AC terminal through the star/delta switching unit, the AC/DC subunit comprises at least one DC terminal, the DC terminal constitutes the intermediate DC bus, the AC/DC subunit is connected to a first terminal of the isolated DC/DC subunit through the intermediate DC bus, and a second terminal of the isolated DC/DC subunit is connected to the DC power terminal.

13. The power converter according to claim 12, wherein the signal reflecting the voltage of the DC power terminal comprises: an intermediate DC bus voltage.

14. The power converter according to claim 12, wherein second terminals of all the isolated DC/DC subunits in the first power conversion unit, the second power conversion unit, and the third power conversion unit are connected in series or in parallel with each other to the DC power terminal.

15. The power converter according to claim 12, wherein the controller is configured to adjust a gain of the AC/DC subunit or a gain of the isolated DC/DC subunit according to the signal reflecting the voltage of the DC power terminal.

16. The power converter according to claim 12, wherein the isolated DC/DC subunit comprises: a primary DC/AC circuit, a passive network, a high frequency transformer, and a secondary AC/DC circuit;

the primary DC/AC circuit is connected to a primary winding of the high frequency transformer through the passive network, and a secondary winding of the high frequency transformer is connected to the secondary AC/DC circuit; and a DC terminal of the primary DC/AC circuit is connected to the DC terminal of the AC/DC subunit, and a DC terminal of the secondary AC/DC circuit is connected to the DC power terminal.

17. The power converter according to claim 16, wherein the controller is configured to adjust a gain of the isolated DC/DC subunit by changing a modulation mode or a switching frequency of the isolated DC/DC subunit.

18. The power converter according to claim 17, wherein the primary DC/AC circuit is a series half-bridge circuit, and the modulation mode of the isolated DC/DC subunit is a symmetric modulation or an asymmetric modulation.

19. The power converter according to claim 16, wherein the passive network is a series resonant network, a parallel resonant network or only has an inductive unit; the secondary AC/DC circuit is a full-bridge rectifier circuit, a full wave rectifier circuit or an uncontrolled rectifier circuit.

20. The power converter according to claim 1, wherein each of the first power conversion unit, the second power conversion unit, and the third power conversion unit comprises multiple AC/DC subunits and multiple isolated DC/DC subunits;

wherein AC terminals of the multiple AC/DC subunits are connected to each other in series, and DC terminals of the AC/DC subunits are respectively connected to first terminals of the isolated DC/DC subunits in one-to-one correspondence.

21. A power supply system, comprising a power converter according to claim 1, wherein the three-phase AC terminal of the power converter is connected to a grid directly or connected with grid through a filter, and the DC power terminal is connected to a load or a power equipment.

22. The power supply system according to claim 21, wherein the load or the power equipment is a rechargeable battery, a photovoltaic panel, a super capacitor, a DC power source, a DC/AC converter or a DC/DC converter.

* * * * *